(12) United States Patent
Armbruster et al.

(10) Patent No.: US 9,094,643 B2
(45) Date of Patent: Jul. 28, 2015

(54) COLOR-TO-COLOR CORRECTION IN A PRINTING SYSTEM

(71) Applicants: Randy E. Armbruster, Rochester, NY (US); Christopher M. Muir, Rochester, NY (US)

(72) Inventors: Randy E. Armbruster, Rochester, NY (US); Christopher M. Muir, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 23 days.

(21) Appl. No.: 13/664,472

(22) Filed: Oct. 31, 2012

(65) Prior Publication Data
US 2013/0286071 A1 Oct. 31, 2013

Related U.S. Application Data

(60) Provisional application No. 61/638,745, filed on Apr. 26, 2012.

(51) Int. Cl.
*B41J 29/38* (2006.01)
*H04N 1/50* (2006.01)

(52) U.S. Cl.
CPC ..................... *H04N 1/506* (2013.01)

(58) Field of Classification Search
USPC ..................................... 347/14, 19
See application file for complete search history.

(56) References Cited

U.S. PATENT DOCUMENTS

| | | | |
|---|---|---|---|
| 5,272,492 A | 12/1993 | Castelli | |
| 2003/0133721 A1* | 7/2003 | Brewington | 399/19 |
| 2006/0023231 A1 | 2/2006 | Ohmiya | |
| 2008/0123139 A1 | 5/2008 | Harada | |
| 2008/0278735 A1* | 11/2008 | Wang et al. | 358/1.5 |
| 2008/0278757 A1* | 11/2008 | Wong | 358/1.18 |
| 2010/0119273 A1* | 5/2010 | Komai et al. | 399/395 |
| 2010/0178084 A1* | 7/2010 | Kang et al. | 399/301 |
| 2010/0225955 A1* | 9/2010 | Almen et al. | 358/1.15 |
| 2010/0272462 A1* | 10/2010 | Murayama | 399/74 |
| 2010/0283808 A1* | 11/2010 | Terakado et al. | 347/6 |
| 2012/0033240 A1* | 2/2012 | Kim | 358/1.9 |
| 2012/0236331 A1* | 9/2012 | Taig et al. | 358/1.9 |

FOREIGN PATENT DOCUMENTS

| | | | | |
|---|---|---|---|---|
| EP | 1 424 609 | | 6/2004 | |
| EP | 1424609 A2 | * | 6/2004 | ............. G03G 15/01 |

* cited by examiner

*Primary Examiner* — Geoffrey Mruk
*Assistant Examiner* — Scott A Richmond
(74) *Attorney, Agent, or Firm* — Nancy R. Simon; Amit Singhal

(57) ABSTRACT

A method for performing color-to-color correction while printing multiple copies of a print job having one or more documents includes printing one or more copies of the print job and determining at least one color registration error for at least one type of color registration error produced during the printing of the one or more copies of the print job. A color plane correction value is then determined for each document in the print job and for each color plane error produced during the printing of the one or more copies of the print job. One or more subsequent copies of the print job is printed using the color plane correction values, where the color plane correction values used for each document are the correction values determined for that document. The color plane correction values can be updated periodically, at select times, or after each copy is printed.

14 Claims, 18 Drawing Sheets

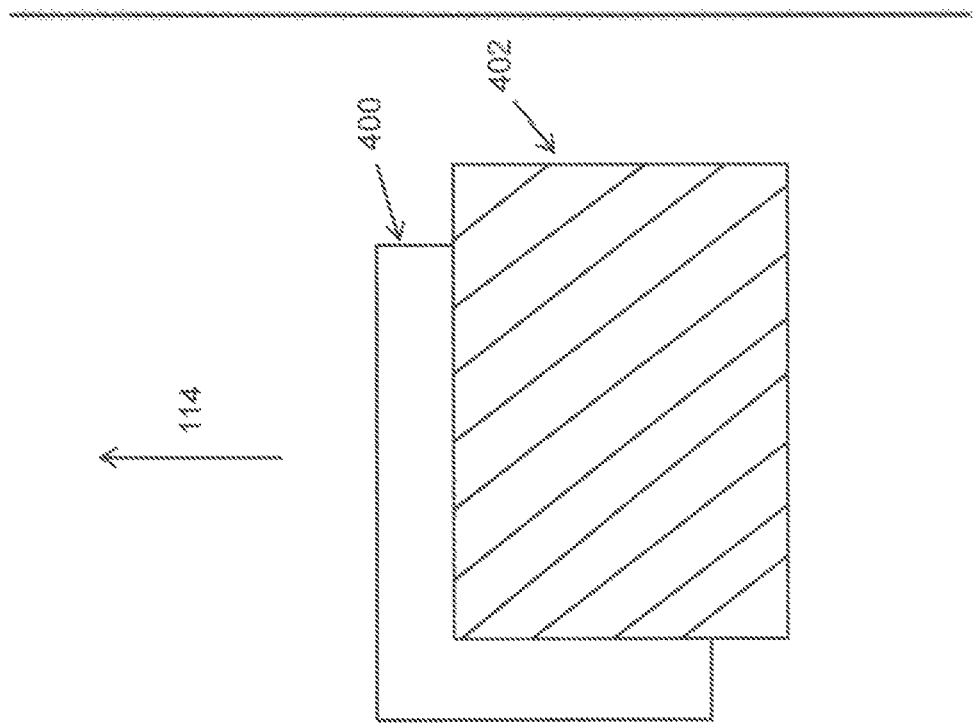
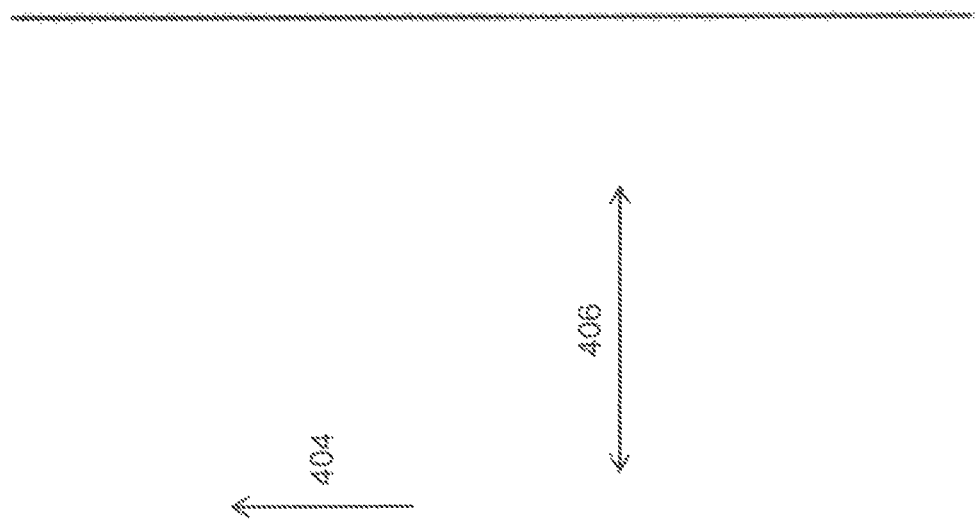
FIG. 4

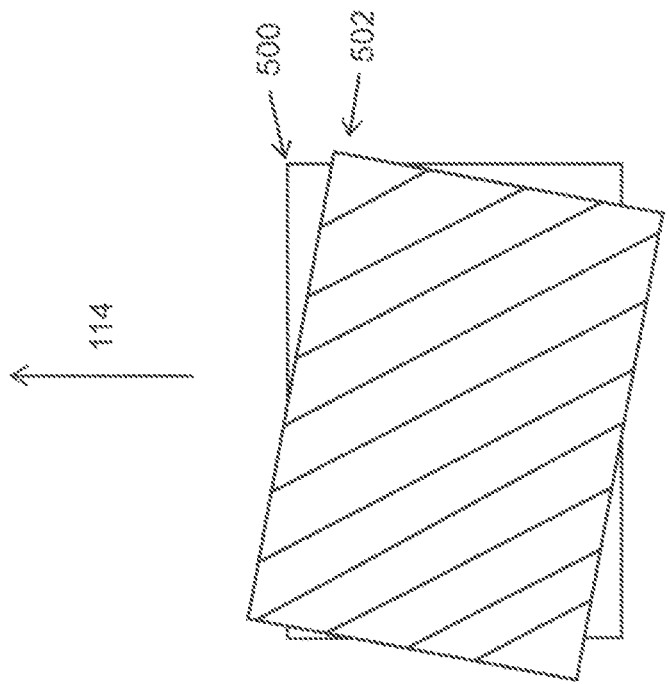
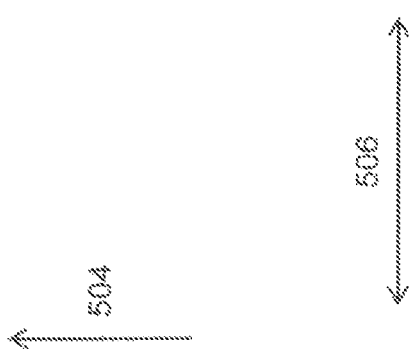
FIG. 5

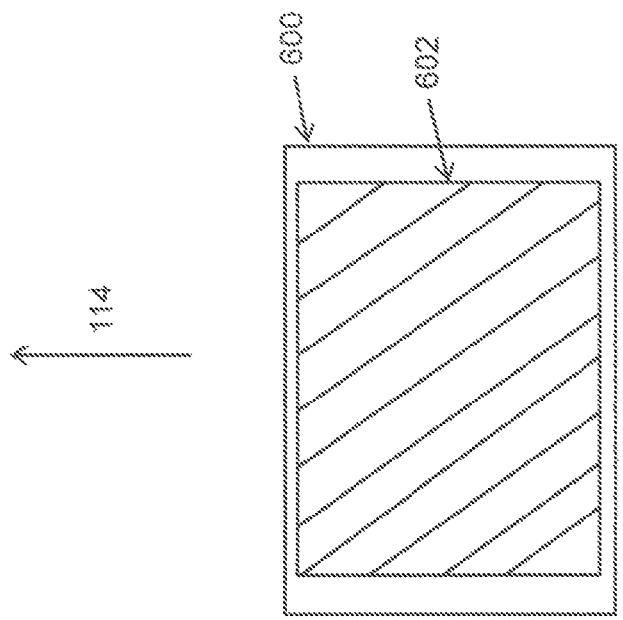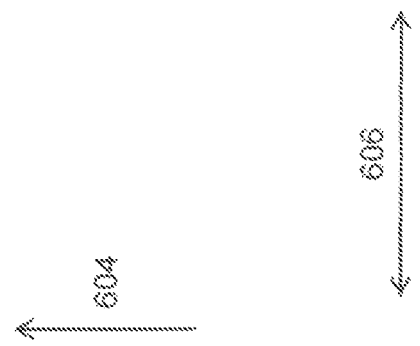
FIG. 6

| DOC NO. | TRANSLATION CORRECTION VALUES ||||||| ROTATION CORRECTION VALUES ||||||| SCALING CORRECTION VALUES ||||||
|---|---|---|---|---|---|---|---|---|---|---|---|---|---|---|---|---|---|---|---|
| | CROSS-TRACK ||| IN-TRACK ||| CROSS-TRACK ||| IN-TRACK ||| CROSS-TRACK ||| IN-TRACK |||
| 1200 | B-C | B-M | B-Y | B-C | B-M | B-Y | B-C | B-M | B-Y | B-C | B-M | B-Y | B-C | B-M | B-Y | B-C | B-M | B-Y |
| 1 | xx | xx | xx | xx | xx | xx | xx | xx | xx | xx | xx | xx | xx | xx | xx | xx | xx | xx |
| 2 | xx | xx | xx | xx | xx | xx | xx | xx | xx | xx | xx | xx | xx | xx | xx | xx | xx | xx |
| 3 | xx | xx | xx | xx | xx | xx | xx | xx | xx | xx | xx | xx | xx | xx | xx | xx | xx | xx |
| 4 | xx | xx | xx | xx | xx | xx | xx | xx | xx | xx | xx | xx | xx | xx | xx | xx | xx | xx |
| 5 | xx | xx | xx | xx | xx | xx | xx | xx | xx | xx | xx | xx | xx | xx | xx | xx | xx | xx |
| 6 | xx | xx | xx | xx | xx | xx | xx | xx | xx | xx | xx | xx | xx | xx | xx | xx | xx | xx |
| 7 | xx | xx | xx | xx | xx | xx | xx | xx | xx | xx | xx | xx | xx | xx | xx | xx | xx | xx |

*FIG. 12*

COLOR-TO-COLOR CORRECTION IN A PRINTING SYSTEM

CROSS-REFERENCE TO RELATED APPLICATION(S)

This application claims the benefit of U.S. Provisional Application 61/638,745 filed on Apr. 26, 2012.

TECHNICAL FIELD

The present invention generally relates to inkjet printing systems and more particularly to a method for performing color-to-color correction in an inkjet printing system.

BACKGROUND

In a digitally controlled printing system, a print media is directed through a series of components. The print media can be cut sheet or a continuous web. As the print media moves through the printing system, liquid, for example, ink, is applied to the print media by one or more lineheads. This is commonly referred to as jetting of the ink.

In commercial inkjet printing systems, the print media is physically transported through the printing system at a high rate of speed. For example, the print media can travel 650 to 1000 feet per minute. The lineheads in commercial inkjet printing systems typically include multiple printheads that jet ink onto the print media as the print media is being physically moved through the printing system. A reservoir containing ink or some other material is usually behind each nozzle plate in a linehead. The ink streams through the nozzles in the nozzle plates when the reservoirs are pressurized.

The printheads in each linehead in commercial printing systems typically jet only one color. Thus, there is a linehead for each colored ink when different colored inks are used to print content. For example, there are four lineheads in printing systems using cyan, magenta, yellow and black colored inks. The content is printed by jetting the colored inks sequentially, and each colored ink deposited on the print media is known as a color plane. The color planes need to be aligned, or registered with each other so that the overlapping ink colors produce a quality single image.

Color registration errors can be partitioned into different types. Examples of color registration errors include, but are not limited to, a color plane having a linear translation with respect to another color plane, a color plane being rotated with respect to another color plane, and a color plane being stretched, contracted, or both stretched and contracted with respect to another color plane.

There are several variables that contribute to the registration errors in color plane alignment including physical properties of the print media, conveyance of print media, ink application system, ink coverage, and drying of ink. Color registration errors are typically minimized by controlling these variables. However, controlling these variables can often restrict the range of desired print applications. For example, color plane to color plane registration errors will typically become larger than desired as paper weight for the print application is reduced, when ink coverage is increased and when the amount of ink coverage becomes more variable between printed documents. These limitations compromise the range of suitable applications for ink jet printing systems.

SUMMARY

In one aspect, a method for performing color-to-color correction while printing multiple copies of a print job having one or more documents includes printing one or more copies of the print job and determining at least one color registration error for at least one type of color registration error produced during the printing of the one or more copies of the print job. A color plane correction value is determined for each document in the print job and for each color plane error produced during the printing of the one or more copies of the print job. One or more subsequent copies of the print job is printed using the color plane correction values, where the color plane correction values used for each document are the correction values determined for that document.

According to another aspect, the color plane correction values can be updated periodically, at select times, or after each copy of the print job is printed.

BRIEF DESCRIPTION OF THE DRAWINGS

Embodiments of the invention are better understood with reference to the following drawings. The elements of the drawings are not necessarily to scale relative to each other.

FIG. 4 depicts one example of a color registration error produced by the translation of one color plane relative to another color plane;

FIG. 5 illustrates one example of a color registration error produced by the rotation of one color plane relative to another color plane;

FIG. 6 depicts one example of a color registration error produced by the contraction of one color plane relative to another color plane;

FIG. 12 illustrates one example of a look-up table suitable for storing color plane correction values in an embodiment in accordance with the invention;

DETAILED DESCRIPTION

Figure 1:
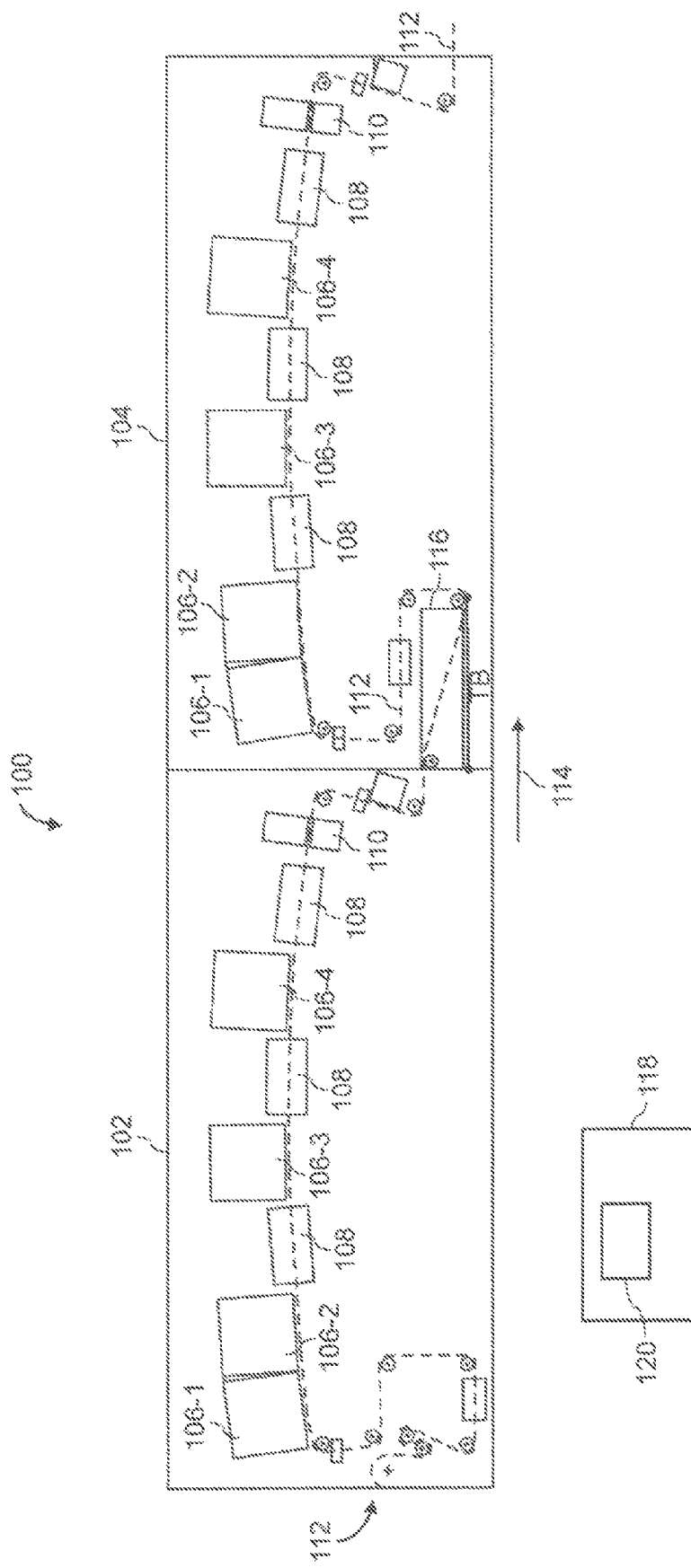
FIG. 1 illustrates one example of a continuous web inkjet printing system.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of embodiments of the present invention can be positioned in a number of different orientations, the directional terminology is used for purposes of illustration only and is in no way limiting.

The present description will be directed in particular to elements forming part of, or cooperating more directly with, a system in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention are applied to color plane registration in inkjet printing systems. However, many other applications are emerging which use inkjet printheads or similar nozzle arrays to emit fluids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. In addition, a nozzle array can jet out gaseous material or other fluids. As such, as described herein, the terms "liquid", "ink" and "inkjet" refer to any material that is ejected by a nozzle array.

Inkjet printing is commonly used for printing on paper. However, printing can occur on any substrate or receiving medium. For example, vinyl sheets, plastic sheets, glass plates, textiles, paperboard, corrugated cardboard, and even human or animal tissue or skin can comprise the print media. Additionally, although the term inkjet is often used to describe the printing process, the term jetting is also appropriate wherever ink or other fluid is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting drops so that print drops reach the print medium and non-print drops are caught. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of print media, generally originating from a source roll. The continuous web of print media is moved relative to the inkjet printing system components via a web transport system, which typically includes drive rollers, web guide rollers, and web tension sensors. Cut sheets refer to individual sheets of print media that are moved relative to the inkjet printing system components via a support mechanism (e.g., rollers and drive wheels or a conveyor belt system) that is routed through the inkjet printing system.

The invention described herein is applicable to both types of printing technologies. As such, the terms linehead and printhead, as used herein, are intended to be generic and not specific to either technology. Additionally, the invention described herein is applicable to both types of print media. As such, the terms print media and web, as used herein, are intended to be generic and not as specific to one type of print media or web or the way in which the print media or web is moved through the printing system. Additionally, the terms linehead, printhead, print media, and web can be applied to other nontraditional inkjet applications, such as printing conductors on plastic sheets or medicines or materials on skin.

The terms "upstream" and "downstream" are terms of art referring to relative positions along the transport path of the print media; points on the transport path move from upstream to downstream. In FIGS. 1-6 the media moves in a direction indicated by transport direction arrow 114. Where they are used, terms such as "first", "second", and so on, do not necessarily denote any ordinal or priority relation, but are simply used to more clearly distinguish one element from another.

Referring now to the schematic side view of FIG. 1, there is shown one example of a continuous web inkjet printing system. Printing system 100 includes a first tower 102 and a second tower 104, each of which includes lineheads 106, dryers 108, and a quality control sensor 110. Each linehead 106 typically includes multiple printheads (not shown) that apply ink or another fluid (gas or liquid) to the surface of the print media 112 that is adjacent to the printheads. For descriptive purposes only, the lineheads 106 are labeled a first linehead 106-1, a second linehead 106-2, a third linehead 106-3, and a fourth linehead 106-4. In the illustrated embodiment, each linehead 106-1, 106-2, 106-3, 106-4 applies a different colored ink to the surface of the print media 112 that is adjacent to the lineheads. By way of example only, linehead 106-1 applies cyan colored ink, linehead 106-2 magenta colored ink, linehead 106-3 yellow colored ink, and linehead 106-4 black colored ink.

The first tower 102 and the second tower 104 also include a web tension system that serves to physically move the print media 112 through the printing system 100 in the transport direction 114 (left to right as shown in the figure). The print media 112 enters the first tower 102 from a source roll (not shown) and the linehead(s) 106 of the first tower applies ink to one side of the print media 112. As the print media 112 feeds into the second tower 104, a turnover module 116 is adapted to invert or turn over the print media 112 so that the linehead (s) 106 of the second tower 104 can apply ink to the other side of the print media 112. The print media 112 then exits the second tower 104 and is collected by a print media receiving unit (not shown).

Processing device 118 can be connected to various components in the web tension system and used to control the positions of the components, such as gimbaled or caster rollers. Processing device 118 can be connected to the quality control sensor 110 and used to process images or data received from the sensor 110. Processing device can be connected to components in printing system 100 using any known wired or wireless communication connection. Processing device 118 can be a separate from printing system 100 or integrated within printing system 100 or within a component in printing system 100.

One or more storage devices 120 is connected to the processing device 118. The storage device 120 can store color plane correction values in an embodiment in accordance with the invention. The storage device 120 can be implemented as one or more external storage devices; one or more storage devices included within the image processing device 118; or a combination thereof.

Figure 2:
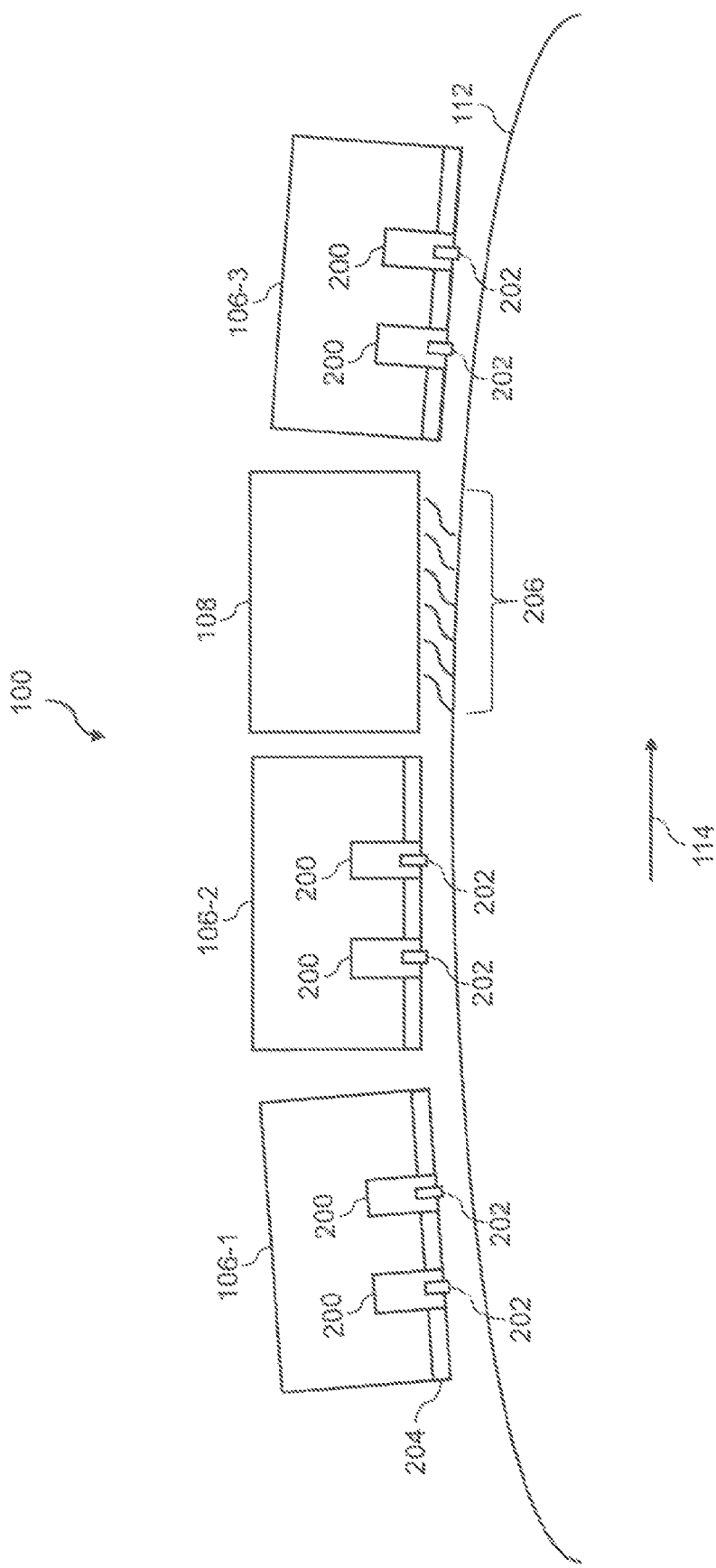
FIG. 2 depicts a portion of printing system 100 in more detail.

FIG. 2 illustrates a portion of printing system 100 in more detail. As the print media 112 is directed through printing system 100, the lineheads 106, which typically include a plurality of printheads 200, apply ink or another fluid onto the print media 112 via the nozzle arrays 202 of the printheads 200. The printheads 200 within each linehead 106 are located and aligned by a support structure 204 in the illustrated embodiment. After the ink is jetted onto the print media 112, the print media 112 passes beneath the one or more dryers 108 which apply heat or air 206 to the ink on the print media.

Figure 3:
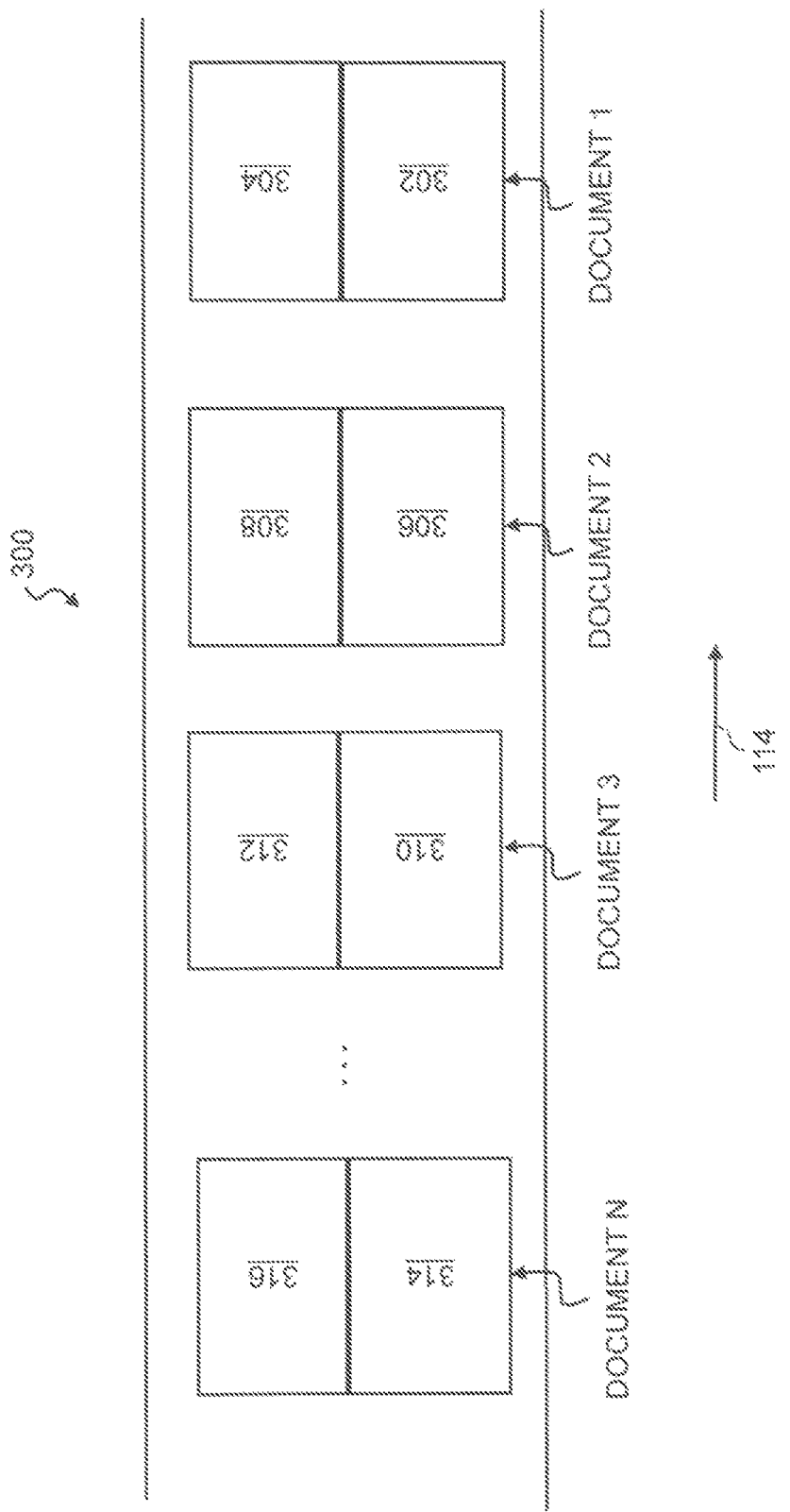
FIG. 3 illustrates a print job including a number of documents in an embodiment in accordance with the invention.

Referring now to FIG. 3, there is shown one example of a print job including a number of documents in an embodiment in accordance with the invention. As used herein, the term "print job" refers to information to be printed more than once, the print job includes one or more documents, and the content in the information is substantially the same each time a copy of the information is printed. The information to be printed can have some variations. For example, a report that is sent to multiple recipients can vary the name and address of the recipient in each printing of the report while maintaining the consistency of the rest of the information to be printed. Examples of such information include, but are not limited to, books, magazines, reports, and transactions.

A print job includes N number of documents, where N is equal to or greater than one. In the illustrated embodiment, the print job 300 includes N documents with each document having two pages 302 and 304, 306 and 308, 310 and 312, and 314 and 316. A book is one example of a print job that is arranged as the print job 300 depicted in FIG. 3.

A print job can have one document positioned across the width of the print media in an embodiment in accordance with the invention. The print job depicted in FIG. 3 illustrates one document positioned across the width on the print media. In other embodiments, a print job can have multiple documents positioned across the width of the print media. A document can include any printed output such as, for example, text, graphics, or photos, individually or in various combinations. The printed output can be disposed anywhere on the print media, and the printed output in each document can differ from the printed content in the other documents in a print job.

When the print job is printed, the print media can receive varying amounts of ink during printing, especially with water-based ink or in high ink laydown regions of the printed content (e.g. a picture with a lot of dense black background). In turn, the aqueous component of the ink is absorbed into the print media and can cause the print media to swell and stretch, especially if the print media is under tension. Stretch can be higher in the direction of movement (i.e., the in-track or transport direction) than in the cross-track direction.

Additionally, drying of the print media can cause the print media to shrink. When the print media is heated in between lineheads, regions of the print media can be stretched and shrunk one or more times as the print media moves through a printing system.

Printing with several color planes in which each color record is printed sequentially requires color laydown registration. Unanticipated or unaccounted for stretch or shrink in the print media can produce a loss of color registration and can lead to blurry content or hue degradation. Additionally, printing on both sides of the print media usually requires front-to-back registration, and the second side of the print media is usually printed significantly later than the first side.

FIG. 4 depicts one example of cross-track and in-track color registration errors produced by the translation of a color plane relative to another color plane. Translation is one type of color registration error. Typically, one color plane 400 is used as a reference color plane. By way of example only, the reference color plane can be black. Errors in registration for the remaining color planes can be determined by comparing each color plane to the reference color plane. Color plane 402 is shifted or translated with respect to the reference color plane 400. Color plane 402 has color registration errors in both the in-track direction 404 and the cross-track direction 406 in the illustrated embodiment.

FIG. 5 illustrates one example of cross-track and in-track color registration errors caused by the rotation of a color plane relative to another color plane. Rotation is another type of color registration error. Color plane 502 is rotated with respect to a reference color plane 500. Color plane 502 has color registration errors with respect to the reference color plane 500 in both the in-track direction 504 and the cross-track direction 506.

FIG. 6 depicts one example of cross-track and in-track color registration errors caused by the stretch or contraction of a color plane relative to another color plane. Stretch and contraction are another type of color registration error. Color plane 602 is contracted in both the in-track and cross-track directions with respect to the reference color plane 600. Color plane 602 has color registration errors in both the in-track direction 604 and the cross-track direction 606.

Other embodiments in accordance with the invention can contract in only one direction or can stretch only one direction. Stretch or shrink can occur in the in-track direction, the cross-track direction, or both the in-track and cross-track directions. Alternatively, one color plane can contract in one direction (e.g., cross-track direction) and stretch in the other direction (e.g., in-track direction) in other embodiments in accordance with the invention. And finally, other embodiments in accordance with the invention can have various combinations of the types of color registration errors shown in FIGS. 4-6, or can have different types of color registration errors.

The color registration errors can repeat each time a document in a print job is printed. Moreover, the repeating color registration errors can be specific to document in the print job. For example, in a print job having three documents, the color registration errors in the second document can repeat each time the second document is printed. The color registration errors for the third document can be different from the color registration errors for the second document. And the color registration errors in the third document can repeat each time the third document is printed.

Figure 7:
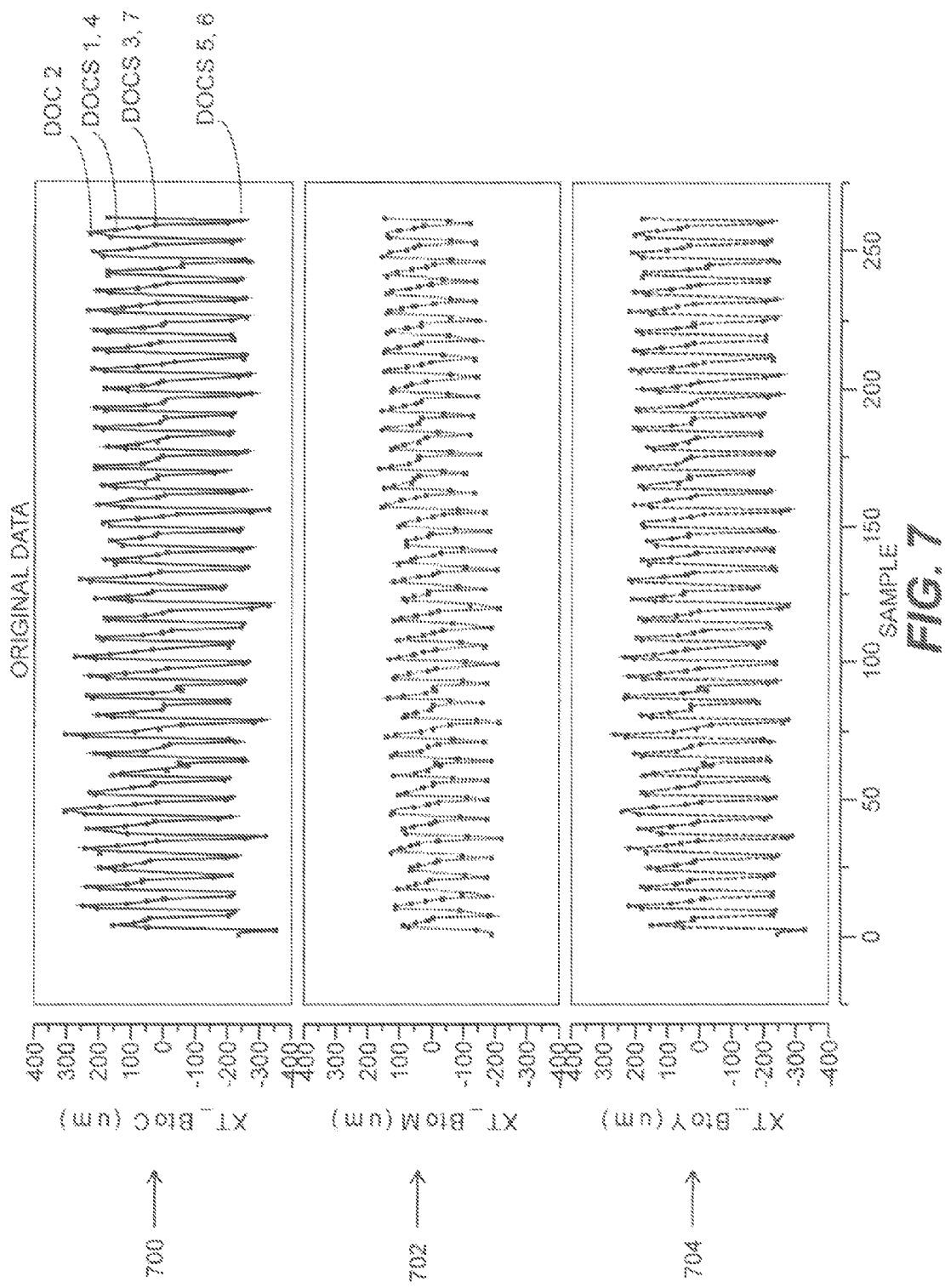
FIG. 7 illustrates one example of plots of the repeatability of color-to-color registration errors in tower 102 in the cross-track direction in an embodiment in accordance with the invention.

FIG. 7 illustrates one example of plots of the repeatability of color-to-color registration in tower 102 in the cross-track direction in an embodiment in accordance with the invention. A plot 700 for a first ink color, a plot 702 for a second ink color, and a plot 704 for a third ink color are shown. For example, the first ink color can be cyan, the second ink color magenta, and the third ink color yellow.

The color registration errors for the embodiments shown in FIGS. 7-10 can be determined by comparing each color plane to a reference color plane, and the color registration errors can be produced by one or any combination of color plane translation, color plane rotation, and color plane stretch or contraction depicted in FIGS. 4-6. By way of example only, the reference color can be black. Additionally, the print job associated with the embodiments shown in FIGS. 7-10 included seven documents. Each plotted point on the plots represents one of the seven documents.

The variations in the color-to-color registrations for each document are shown in each period of the waveform, and the repeatability of the color-to-color registration errors is identifiable. By way of example only, document 2 repeatedly has a registration error at the positive peak of each waveform while the registration errors for documents 1 and 4 are less than the error for document 2. The registration errors for documents 3 and 7 are less than the errors for documents 1 and 4, and the registration errors for documents 5 and 6 repeatedly fall at the bottom of the waveforms.

Figure 8:
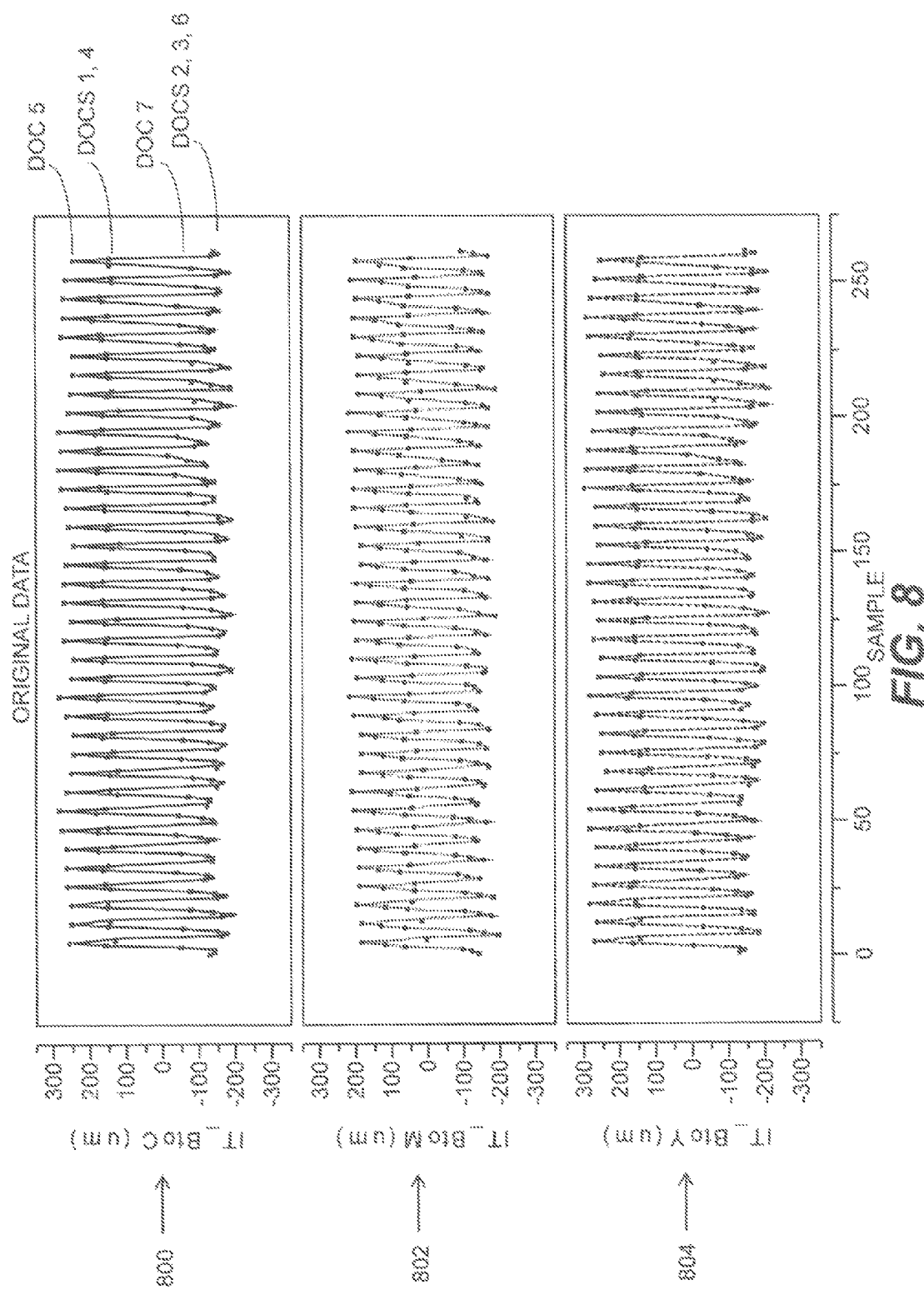
FIG. 8 depicts one example of plots of the repeatability of color-to-color registration errors in tower 102 in the in-track direction in an embodiment in accordance with the invention.

FIG. 8 illustrates one example of plots of the repeatability of color-to-color registration in tower 102 in the in-track direction in an embodiment in accordance with the invention. A plot 800 for the first ink color, a plot 802 for the second ink color, and a plot 804 for the third ink color are shown. In the in-track direction, document 5 repeatedly has a registration error at the positive peak of each waveform while the registration errors for documents 1 and 4 are less than the error for document 5. The registration error for document 7 is less than the errors for documents 1 and 4, and the registration errors for documents 2, 3, and 6 repeatedly lie at the bottom of the waveforms.

Figure 9:
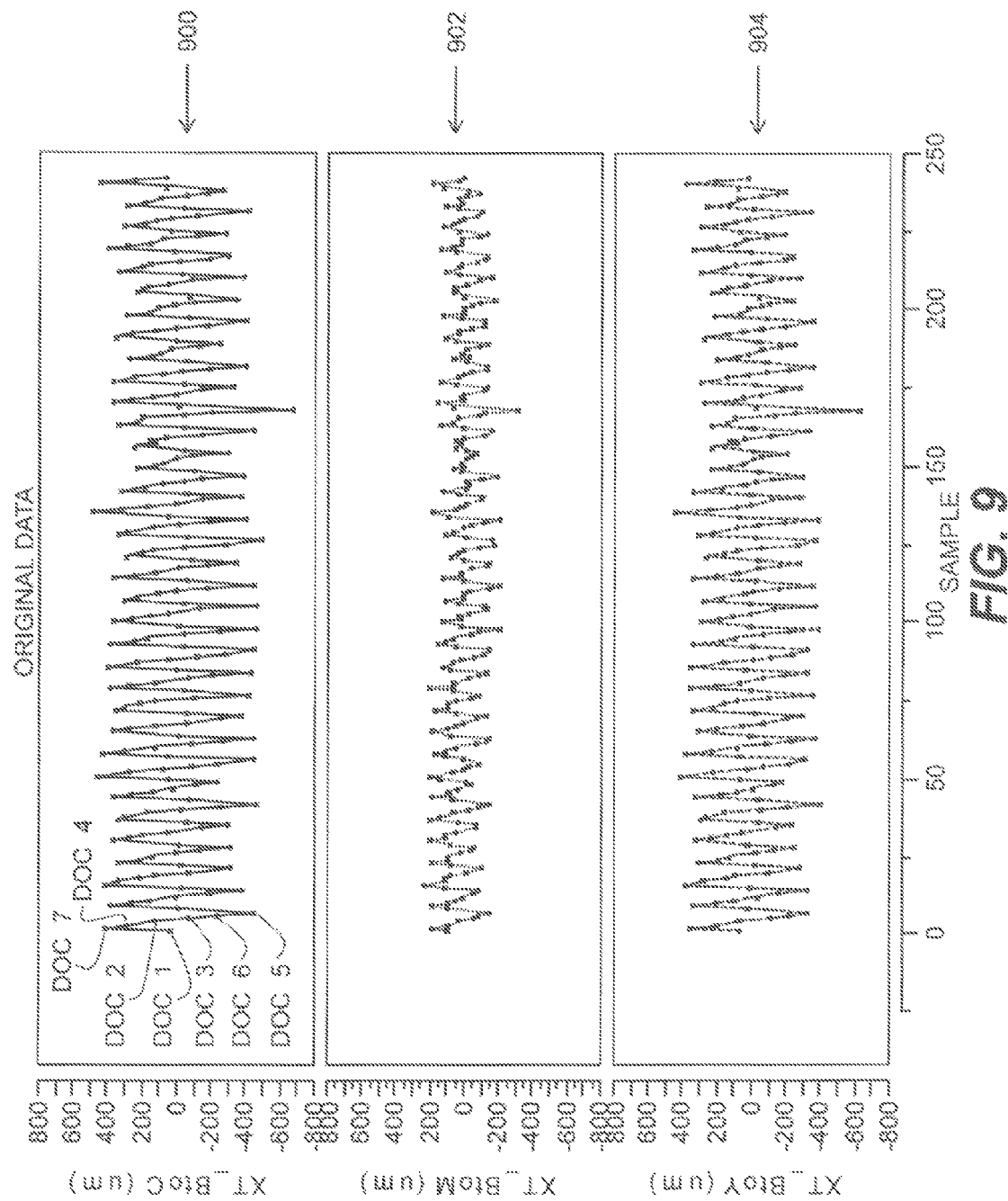
FIG. 9 illustrates one example of plots of the repeatability of color-to-color registration errors in tower 104 in the cross-track direction in an embodiment in accordance with the invention.

Referring now to FIG. 9, there is shown one example of plots of the repeatability of color-to-color registration in tower 104 in the cross-track direction in an embodiment in accordance with the invention. A plot 900 for the first ink color, a plot 902 for the second ink color, and a plot 904 for the third ink color are depicted. In the cross-track direction in the second tower (tower 104), document 7 repeatedly has a registration error at the positive peak of each waveform while the registration error for document 4 is less than the error for document 7. The registration error for document 2 is less than the error for document 4. The registration error for document 1 is less than the error for document 2. The registration error for document 3 is less than the error for document 1. And the registration error for document 5 is less than the error for document 6.

Figure 10:
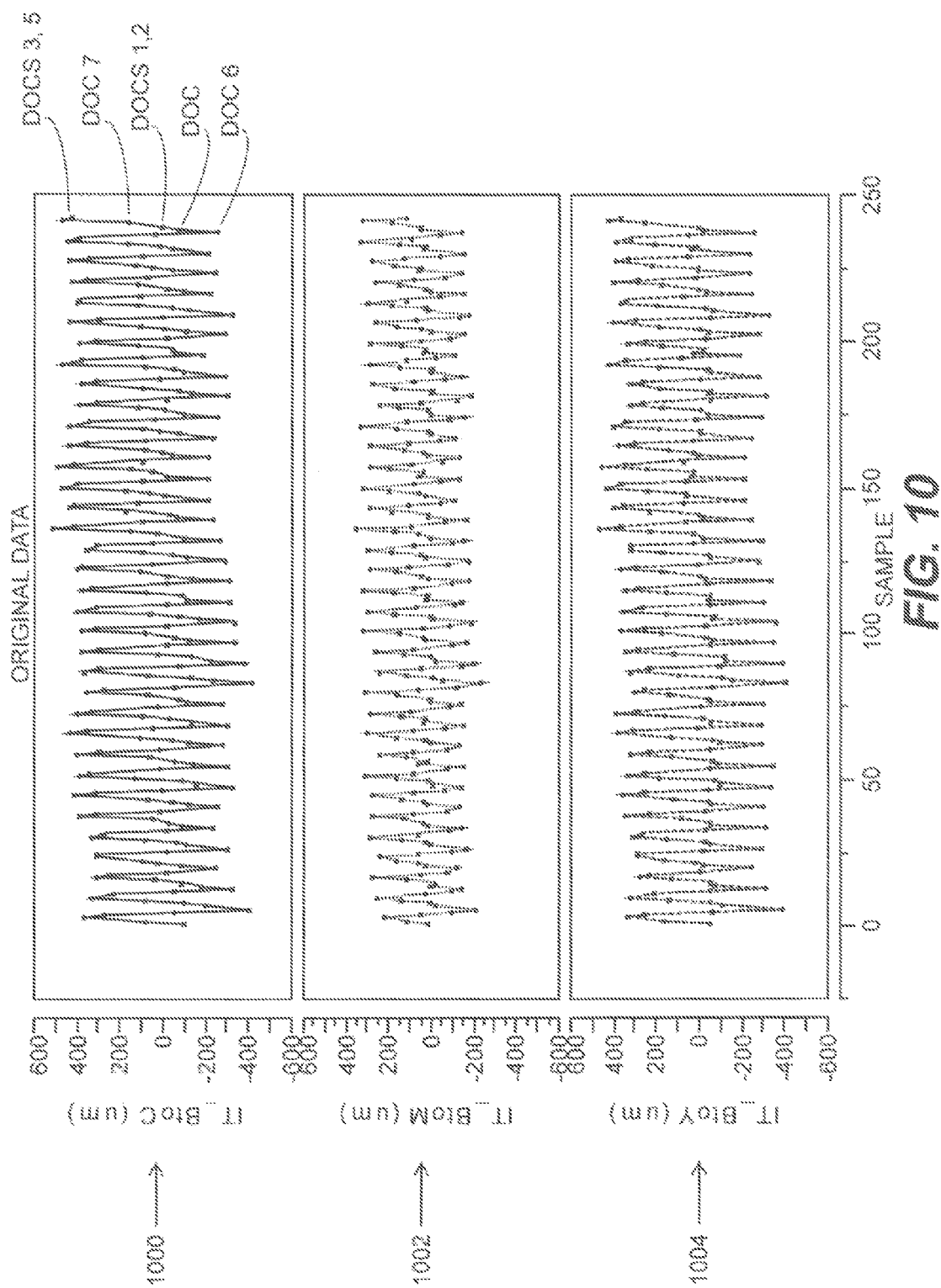
FIG. 10 depicts one example of plots of the repeatability of color-to-color registration errors in tower 104 in the in-track direction in an embodiment in accordance with the invention.

FIG. 10 illustrates one example of plots of the repeatability of color-to-color registration in tower 104 in the in-track direction in an embodiment in accordance with the invention. A plot 1000 for the first ink color, a plot 1002 for the second ink color, and a plot 1004 for the third ink color are shown. In the in-track direction, documents 3 and 5 repeatedly have registration errors at the positive peak of each waveform while the registration error for document 7 is less than the values for documents 3 and 5. The registration errors for documents 1 and 2 are less than the error for document 7, and the registration errors for documents 4 and 6 repeatedly fall at the bottom of the waveforms.

Figure 11A:
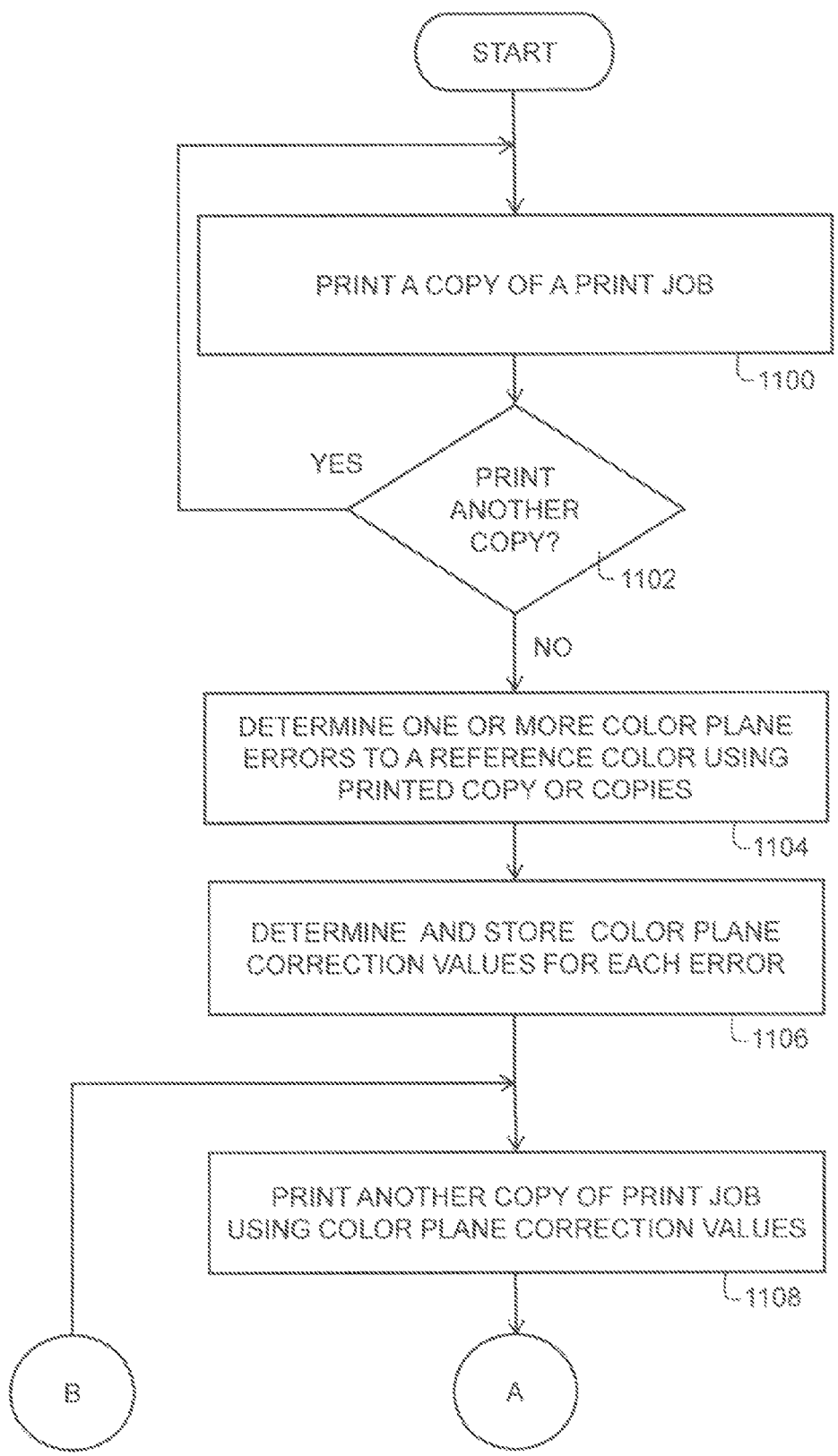
FIGS. 11A-11C is a flowchart of a method for color-to-color correction in an embodiment in accordance with the invention.
Figure 11B:
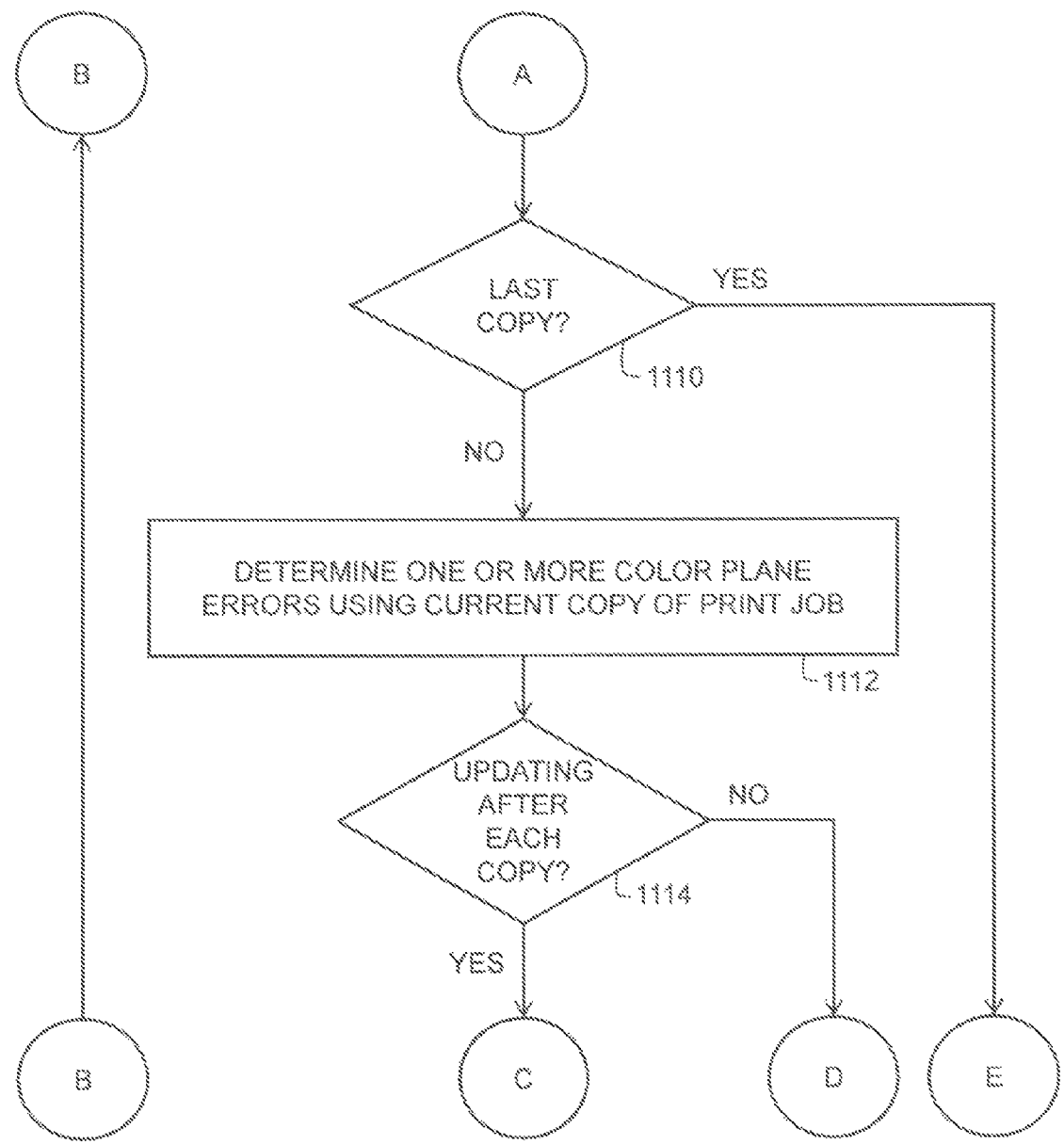
Figure 11C:
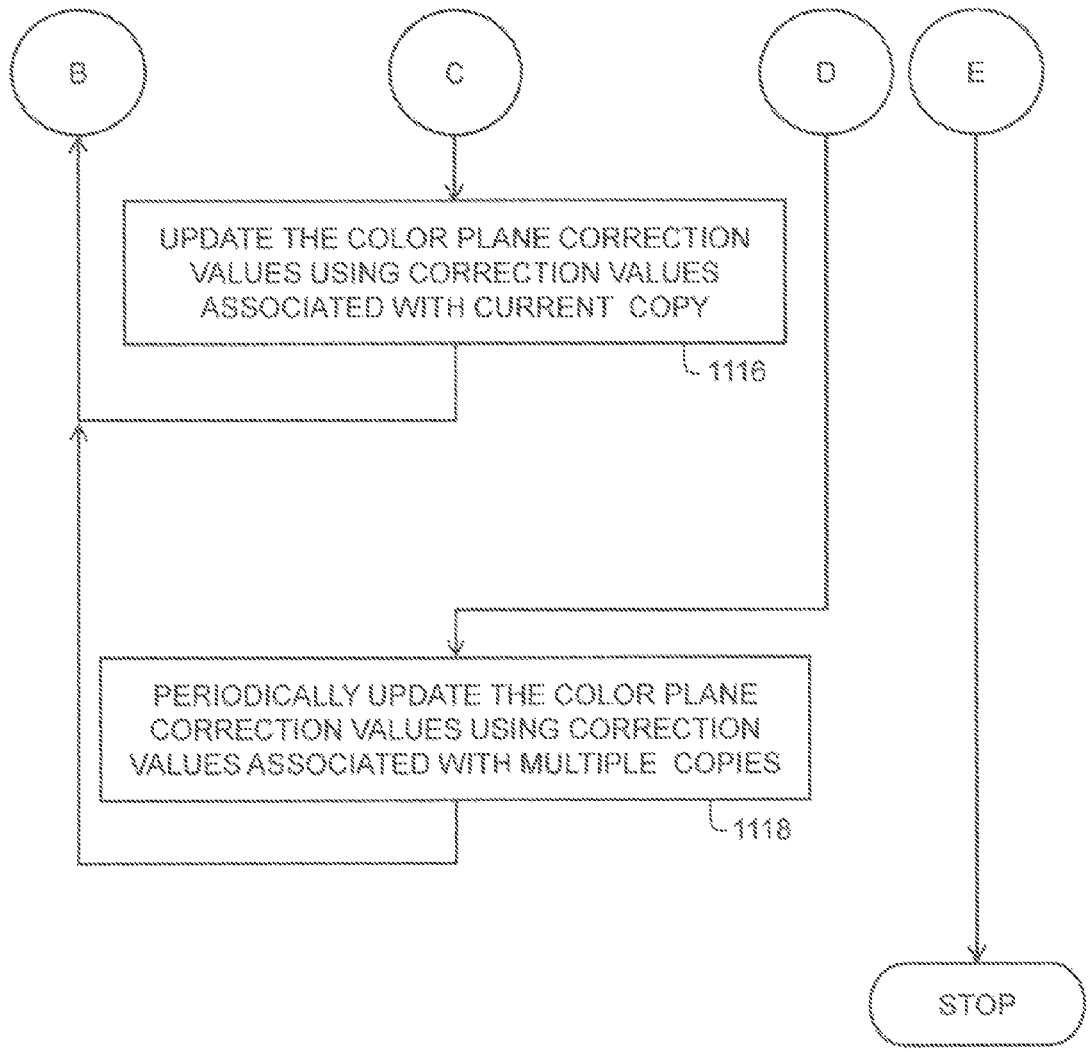

Referring now to FIGS. 11A-11C, there is shown a flowchart of a method for color-to-color correction in an embodiment in accordance with the invention. Initially, one copy of the print job is printed, as shown in block 1100. A determination is made at block 1102 as to whether or not another copy of the print job is to be printed. In one or more embodiments of the invention, more than one copy of a print job is printed before color-to-color correction begins. The number of copies to be printed before color-to-color correction begins can depend on the characteristics of the print job. For example, the amount the liquid or ink load varies within the documents in a print job, the type or weight of the print media, or the type of liquid being jetted onto the print media can influence the decision regarding the number of copies to print before beginning color-to-color correction. If another copy is to be printed, the process returns to block 1100 and repeats until all of the desired number of print jobs has been printed.

When another copy of the print job is not printed, the method passes to block 1104 where at least one color registration error for one or more types of color registration errors is determined for each document in the print job. For example, a quality control sensor and a processing device, such as sensor 110 and processing device 118 in FIG. 1, can be used to determine the color registration errors and the color plane correction values. In one embodiment in accordance with the invention, each color registration error is determined by comparing the measured color plane to a reference color plane. By way of example only, the reference color plane can be black in a CMYK printing system. A color registration error can be identified for any type of color registration error or errors, such as color plane translation errors, color plane rotation errors and color plane stretch or contraction errors.

Other embodiments in accordance with the invention can determine the color registration errors differently. By way of example only, a target location on the web is identified and the color registration error of each color plane is measured from the target.

Next, as shown in block 1106, color plane correction values for each document in the print job, for the types of color registration errors, and for each color plane are determined and stored in memory. For example, the color plane correction values can be stored in look-up table in storage device 120. FIG. 12 depicts one example of a look-up table that is suitable for storing color plane correction values in an embodiment in accordance with the invention. Color correction values are determined for three different types of color registration errors, translation, rotation, and stretch or contraction in the illustrated embodiment. The color registration errors are also determined for the in-track and cross-track directions. So for each document, eighteen color correction values are determined and stored in respective locations in the look-up table. The color correction values can be any value, including zero.

Four different ink colors are used in the example. The four ink colors can be black, magenta, cyan, and yellow, with black serving as the reference color. Thus, the color correction values are determined for black-to-cyan (B-C), black-to-magenta (B-M), and black-to-yellow (B-Y).

As described earlier, color correction values are determined for each document in a print job, for each type of color registration error, and for each color plane in a document. Thus, the color correction values are specific to each document. For example, the color correction value 1200 determined for document 1 regarding translation in the cross-track direction for black-to-cyan (B-C) can be different from the color correction value 1202 determined for document 7 for the same type of color registration error (i.e., translation in the cross-track direction for black-to-cyan (B-C)).

Returning again to FIG. 11A, another copy of the print job (the "current copy") is printed using the corresponding color plane correction values for each respective document in the print job (block 1108). A determination is then made at block 1110 as to whether or not the current copy of the print job is the last copy to be printed. If not, the process continues at block 1112 where color registration errors are determined using the current copy of the print job. A determination is then made at block 1114 as to whether or not the color plane correction values are to be updated after each copy of a print job is printed. If so, the method passes to block 1116 where the color plane correction values are updated using the color plane correction values determined for the current print job. The process then returns to block 1108 and repeats until all of the copies of the print job are printed.

Returning again to block 1114, if the color plane correction values are not updated after each copy is printed, the method passes to block 1118 where the color plane correction values are updated periodically or at select times using the color plane correction values determined for a given number of copies of the print job. The process then returns to block 1108 and repeats until all of the copies of the print job are printed.

The color plane correction values can be updated at block 1116 or 1118 using different known techniques. For example, a running average of each color plane correction value can be determined. Alternatively, a rolling window of color plane correction values can be determined. The rolling window can include X number of color registration values. For example, the correction values for the last five copies of the print job can be used to update the color plane correction values. Alternatively, the color plane correction values associated with every nth copy of the print job, such as for every third or fifth copy, can be used to update the color plane correction values.

Other embodiments in accordance with the invention can add, delete or modify one or more blocks shown in FIG. 11. For example, the color plane correction values can be updated for each copy printed for a given number of copies, and then the method can periodically update the color plane correction values. Alternatively, once determined, the color plane correction values may not be updated during a print job.

Figure 13:
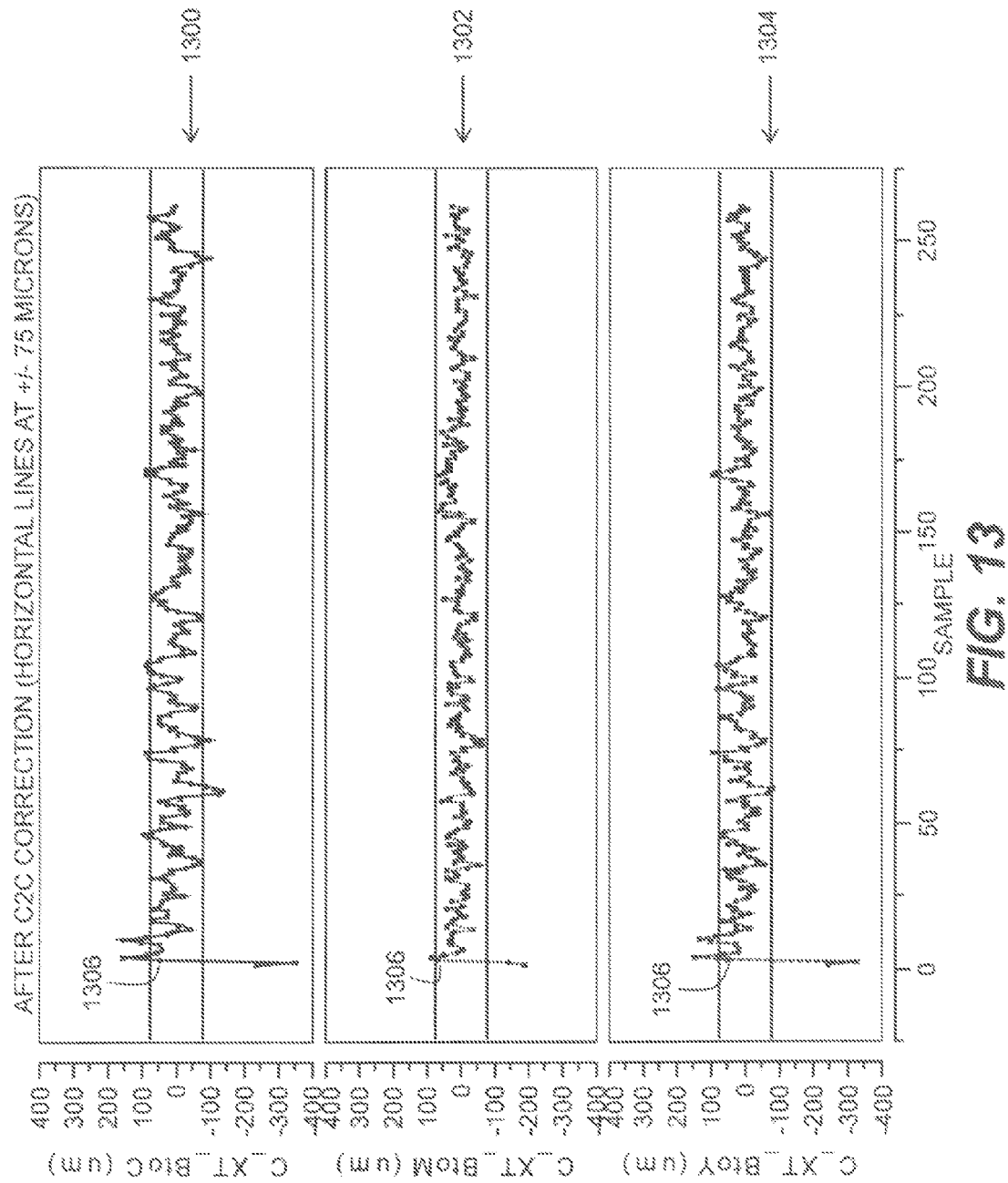
FIG. 13 depicts one example of plots of the corrected color-to-color registration errors in tower 102 in the cross-track direction in an embodiment in accordance with the invention.
Figure 14:
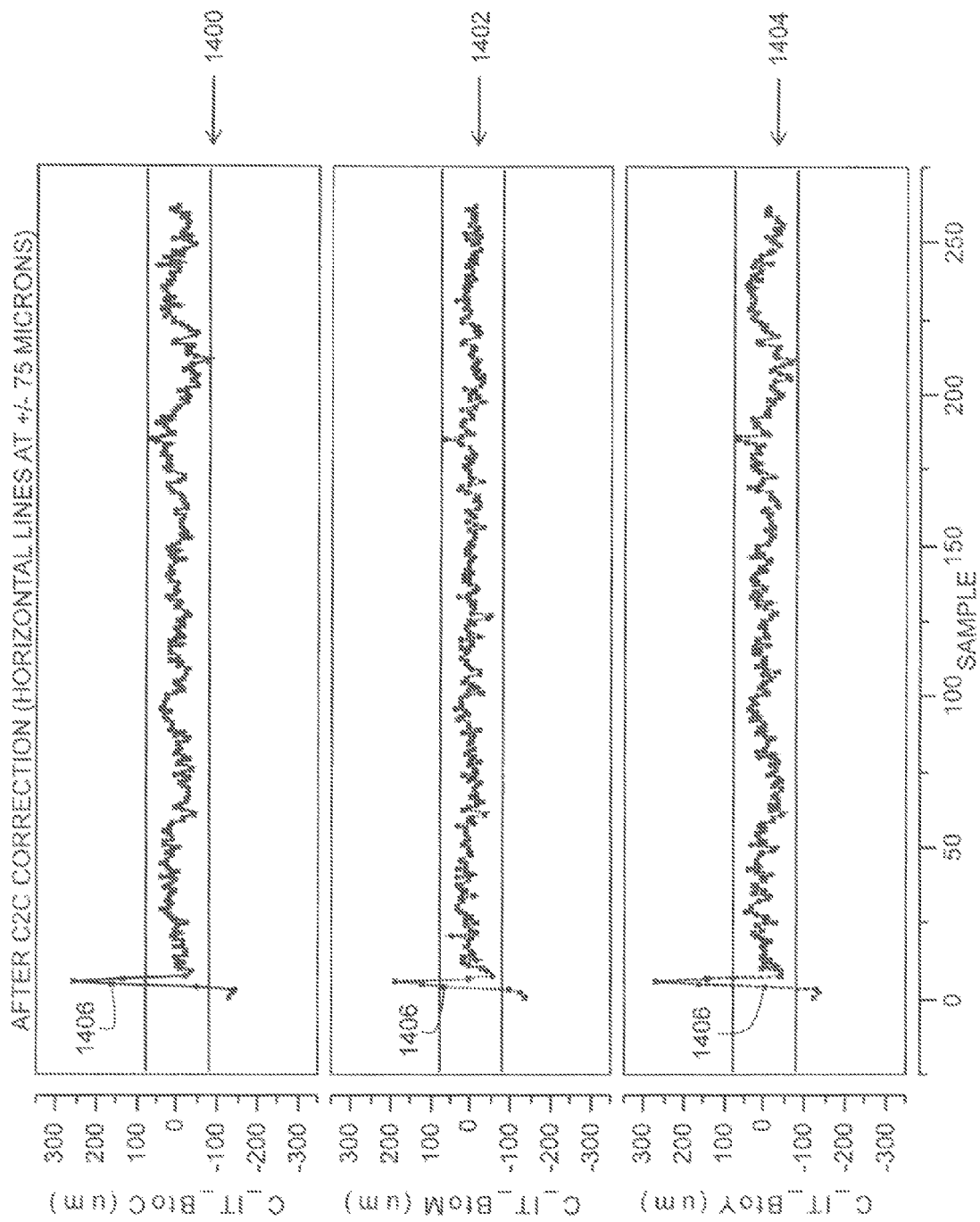
FIG. 14 illustrates one example of plots of the corrected color-to-color registration errors in tower 102 in the in-track direction in an embodiment in accordance with the invention.

Referring now to FIG. 13, there is shown one example of plots of the corrected by document color-to-color registration in tower 102 in the cross-track direction, while FIG. 14 illustrates one example of plots of the corrected by document color-to-color registration in the in-track direction in an embodiment in accordance with the invention. Plots 1300 and 1400 correspond to the respective plots of the first ink color shown in FIGS. 7 and 8, plots 1302 and 1402 to the respective plots of the second ink color illustrated in FIGS. 7 and 8, and plots 1304 and 1404 to the respective plots of the third ink color depicted in FIGS. 7 and 8.

The registration errors for the embodiments shown in FIGS. 13-16 are determined by comparing each color plane to a reference color plane. Additionally, the print job associated with the embodiments shown in FIGS. 13-16 included seven documents. Each plotted point on the plots represents one of the seven documents.

The variations in the color-to-color registrations for each document are shown in each period of the waveform, and the repeatability of the color-to-color registration errors is significantly reduced compared to the plots in FIGS. 7-8. Regions 1306 and 1406 of the plots depict the color registration errors associated with the beginning of the printing of the documents in the print job. As can be seen, the color-to-color registration errors are larger compared to the later or subsequent copies of the print job. This can be due to the fact that the color plane correction values are not as finely tuned or updated when the earlier copies are printed compared to the later copies.

Figure 15:
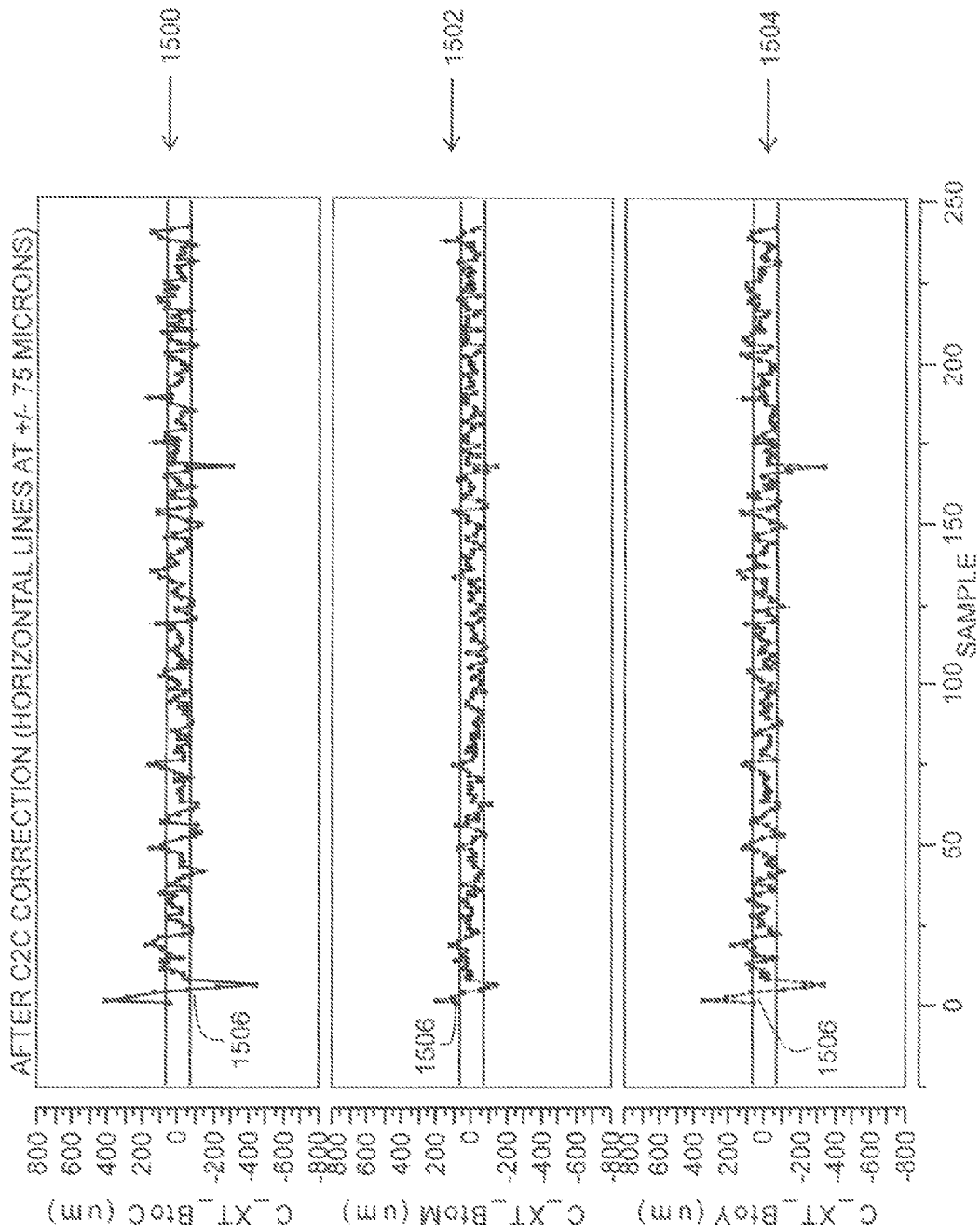
FIG. 15 depicts one example of plots of the corrected color-to-color registration errors in tower 104 in the cross-track direction in an embodiment in accordance with the invention.
Figure 16:
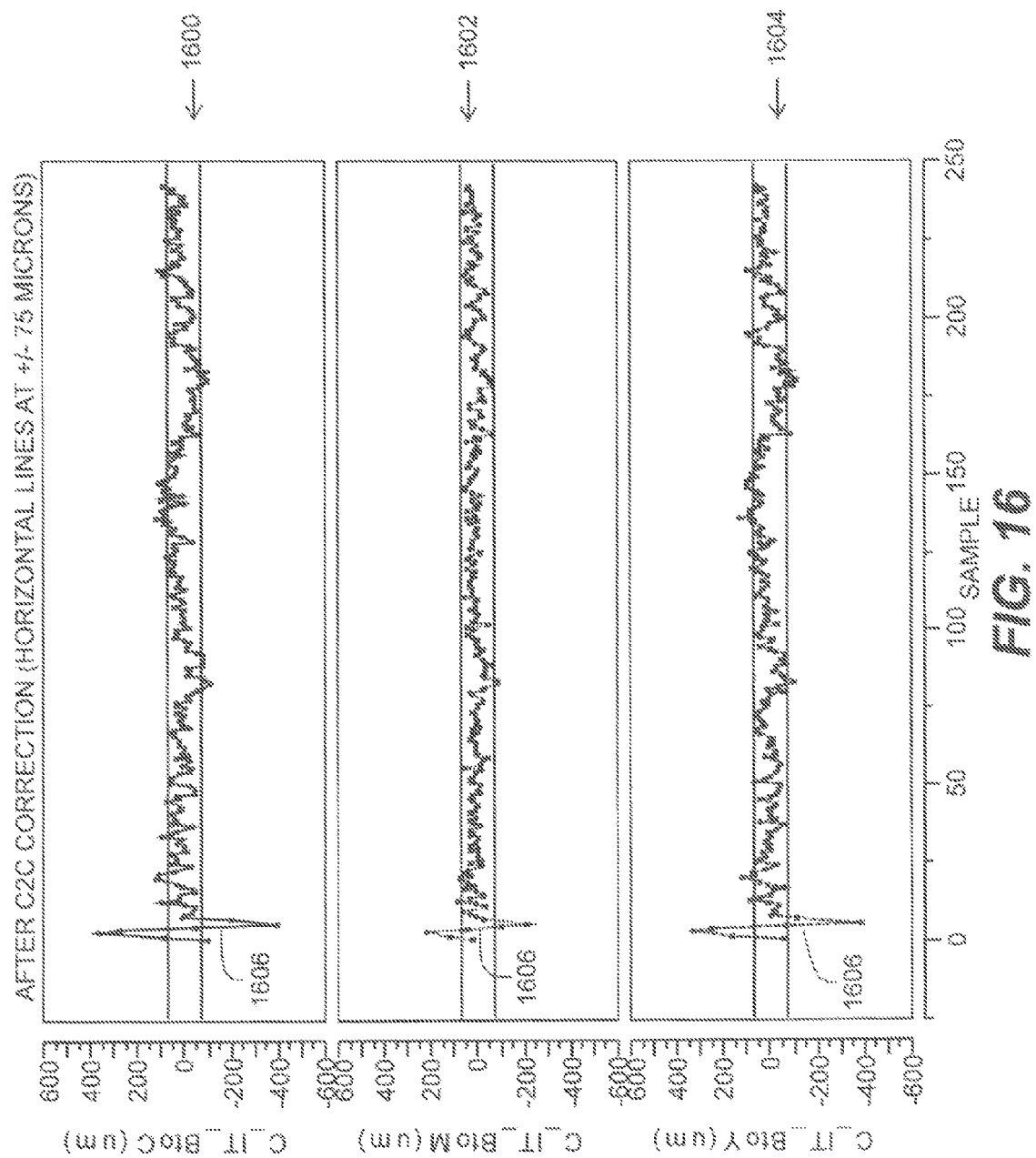
FIG. 16 illustrates one example of plots of the corrected color-to-color registration errors in tower 104 in the in-track direction in an embodiment in accordance with the invention.

FIG. 15 depicts one example of plots of the corrected by document color-to-color registration in tower 104 in the cross-track direction, while FIG. 16 illustrates one example of plots of the corrected by document color-to-color registration in tower 104 in the in-track direction in an embodiment in accordance with the invention. Plots 1100 and 1200 correspond to the respective plots of the first ink color shown in FIGS. 6-7, plots 1102 and 1202 to the respective plots of the second ink color illustrated in FIGS. 6-7, and plots 1104 and 1204 to the respective plots of the third ink color depicted in FIGS. 6-7.

The repeatability of the color-to-color registration errors is significantly reduced compared to the plots in FIGS. 6 and 7. Regions 1106 and 1206 of the plots depict the color registration errors associated with the beginning of the printing of the documents in the print job. As can be seen, the color-to-color registration errors are larger compared to the later or subsequent copies of the print job. This can be due to the fact that the color plane correction values are not as finely tuned or updated when the earlier copies are printed compared to the later copies.

The invention has been described in detail with particular reference to certain preferred embodiments thereof, but it will be understood that variations and modifications can be effected within the spirit and scope of the invention. And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

1. A method for performing color-to-color correction while printing multiple copies of a print job having one or more documents can include printing a first copy of the print job and determining at least one color registration error for at least one type of color registration error produced during the printing of the first copy of the print job. For each document in the print job, a color plane correction value is determined for each color plane error produced during the printing of the first copy of the print job. A second copy of the print job is printed using the color plane correction values, where the color plane correction value used when printing each document in the second copy of the print job is the color plane correction value determined for that document.

2. The method in clause 1 can include storing each color plane correction value.

3. The method in clause 1 or 2 can include determining at least one color registration error for the at least one type of color registration error produced during the printing of the second copy of the print job, and for each document in the print job, determining a color plane correction value for each color plane error produced during the printing of the second copy of the print job. Each color plane correction value can be updated using a respective color plane correction value associated with the printing of the second copy of the print job. A subsequent copy of the print job can be printed using the updated color plane correction values, where the updated color plane correction value used when printing each document in the subsequent copy of the print job is the color plane correction value determined for that document.

4. The method as in clause 3, where determining at least one color registration error for the at least one type of color registration error produced during the printing of the second copy of the print job can include determining at least one color registration error for the at least one type of color registration error with respect to the reference color plane produced during the printing of the second copy of the print job.

5. The method in clause 3 or clause 4 can include determining at least one color plane error for at least one type of color registration error produced during the printing of the subsequent copy of the print job, and for each document in the print job, determining a color plane correction value for each color plane error produced during the printing of the subsequent copy of the print job. Each color plane correction value can be updated using a respective color plane correction value associated with the printing of the subsequent copy of the print job. Another copy of the print job can be printed using the stored color plane correction values, where the color plane correction value used when printing each document in the subsequent copy of the print job is the color plane correction value determined for that document.

6. The method as in clause 5, where updating each color plane correction value using a respective color plane correction value associated with the printing of the subsequent copy of the print job can include periodically or non-periodically updating each color plane correction value using respective color plane correction values associated with the printing of two or more subsequent copies of the print job.

7. The method as in clause 5 or clause 6, where determining at least one color plane error for at least one type of color registration error produced during the printing of the subsequent copy of the print job can include determining at least one color plane error for at least one type of color registration error with respect to the reference color plane produced during the printing of the subsequent copy of the print job.

8. The method as in clause 6, where periodically updating each color plane correction value using respective color plane correction values associated with the printing of two or more subsequent copies of the print job can include for each document in the print job and for each type of color plane correction value, determining an average of the color plane correction values using the color plane correction values associated with a given number of subsequent copies of the print job.

9. The method as in clause 7, where after each subsequent print job, each color plane correction value is updated using a respective color plane correction value associated with the printing of the subsequent copy of the print job can include for each document in the print job and for each type of color plane correction value, determining a rolling average of the color plane correction values using respective color plane correction values associated with the subsequent copies of the print job.

10. The method as in clause 5, where updating each color plane correction value using a respective color plane correction value associated with the printing of the subsequent copy of the print job can include after each subsequent print job, updating each color plane correction value using a respective color plane correction value associated with the printing of the subsequent copy of the print job.

11. The method as in clause 10, where updating each color plane correction value using a respective color plane correction value associated with the printing of the subsequent copy of the print job can include for each document in the print job and for each type of color plane correction value, determining an average of the color plane correction value using the respective color plane correction value associated with the first and second copies of the print job.

12. The method in any one of clauses 3-11 can include storing each updated color plane correction value.

13. The method as in any one of clauses 1-12, where determining at least one color registration error for at least one type of color registration error produced during the printing of the first copy of the print job can include determining at least one color registration error for at least one type of color registration error with respect to a reference color plane produced during the printing of the first copy of the print job.

PARTS LIST 100 printing system
102 tower
104 tower
106 linehead
108 dryer
110 quality control sensor
112 print media
114 transport direction
116 turnover module
118 processing device
120 storage device
200 printhead
202 nozzle array
204 support structure
206 heat or air
300 print job
302 page
304 page
306 page
308 page
310 page
312 page
314 page
316 page
400 color plane
402 color plane
404 in-track direction
406 cross-track direction
500 color plane
502 color plane
504 in-track direction
506 cross-track direction
600 color plane
602 color plane
604 in-track direction
606 cross-track direction
700 plot for first color
702 plot for second color
704 plot for third color
800 plot for first color
802 plot for second color
804 plot for third color
900 plot for first color
902 plot for second color
904 plot for third color 1000 plot for first color
1002 plot for second color
1004 plot for third color
1200 color correction value
1202 color correction value
1300 plot for first color
1302 plot for second color
1304 plot for third color
1306 points for starting documents in print job
1400 plot for first color
1402 plot for second color
1404 plot for third color
1406 points for starting documents in print job
1500 plot for first color
1502 plot for second color
1504 plot for third color
1506 points for starting documents in print job
1600 plot for first color
1602 plot for second color
1604 plot for third color
1606 points for starting documents in print job

The invention claimed is:

1. A method for performing color-to-color correction while printing multiple copies of a print job having a plurality of documents, the method comprising:
   printing a first copy of the print job using more than one color plane, wherein one of the color planes is selected as a reference color plane, wherein the content of at least one document in the print job is different from the content of another document in the print job, and wherein the content determines the amount of ink laydown to print the document;
   for each specific document in the print job, determining at least one color registration error for at least one type of color registration error produced during the printing of the specific document of the first copy of the print job by comparing each of the other color planes to the reference color plane, wherein at least one color registration error associated with a first particular one of the plurality of documents in the print job is different from another color registration error associated with a second particular one of the plurality of documents in the print job;
   for each document in the print job, determining a color plane correction value for each color plane error of the specific document of the print job based on the determining at least one color registration error for at least one type of color registration error of the specific document produced during the printing of the first copy of the print job, wherein at least one color plane correction value associated with a first particular one of the plurality of documents in the print job is different from another color plane correction value associated with a second particular one of the plurality of documents in the print job; and
   printing a second copy of the print job using the color plane correction values, wherein a color plane correction value used when printing each specific document in the second copy of the print job is the color plane correction value determined for that specific document of the first copy of the print job.

2. The method as in claim 1, further comprising storing each color plane correction value.

3. The method as in claim 2, further comprising:
   determining at least one color registration error for the at least one type of color registration error produced during the printing of the second copy of the print job;
   for each specific document in the print job, determining a color plane correction value for each color plane error produced during the printing of the specific document of the second copy of the print job;
   updating each stored color plane correction value of the specific document using the determined respective color plane correction value associated with the printing of the specific document of the second copy of the print job; and
   printing a subsequent copy of the print job using the updated color plane correction values, wherein each updated color plane correction value used when printing each specific document in the subsequent copy of the print job is the updated color plane correction value determined for that specific document of the print job.

4. The method as in claim 3, further comprising storing each updated color plane correction value.

5. The method as in claim 4, further comprising:
   determining at least one color plane error for at least one type of color registration error produced during the printing of a specific document of the subsequent copy of the print job;
   for the specific document in the print job, determining a color plane correction value for each determined color plane error produced during the printing of the specific document of the subsequent copy of the print job;
   updating each stored color plane correction value using a respective color plane correction value associated with the printing of the specific document of the subsequent copy of the print job; and
   printing another copy of the print job using the updated color plane correction values, wherein each updated color plane correction value used when printing each specific document in the subsequent copy of the print job is the updated color plane correction value determined for that specific document of the print job.

6. The method as in claim 5, further comprising storing each updated color plane correction value.

7. The method as in claim 5, wherein updating each stored color plane correction value using a respective color plane correction value associated with the printing of a specific document of the subsequent copy of the print job comprises periodically or non-periodically updating each stored color plane correction value using respective color plane correction values associated with the printing of the specific document of two or more subsequent copies of the print job.

8. The method as in claim 5, wherein updating each stored color plane correction value using a respective color plane correction value associated with the printing of a specific document of the subsequent copy of the print job comprises updating each stored color plane correction value after each subsequent print job using a respective color plane correction value associated with the printing of the specific document of the subsequent copy of the print job.

9. The method as in claim 5, wherein updating each stored color plane correction value using a respective color plane correction value associated with the printing of a specific document of the subsequent copy of the print job comprises for the specific document in the print job and for each type of color plane correction value, determining an average of the color plane correction value using the color plane correction value associated with the specific document of the first and second copies of the print job.

10. The method as in claim 7, wherein periodically updating each stored color plane correction value using the color plane correction values associated with the printing of a specific document of two or more subsequent copies of the print job comprises for the specific document in the print job and for each type of color plane correction value, determining an average of the color plane correction values using respective color plane correction values associated with the specific document of a given number of subsequent copies of the print job.

11. The method as in claim 7, wherein after each subsequent print job updating each stored color plane correction value using a respective color plane correction value associated with the printing of the subsequent copy of the print job comprises for each specific document in the print job and for each type of color plane correction value, determining a rolling average of the color plane correction values using respective color plane correction values associated with the specific document of the subsequent copies of the print job.

12. The method as in claim 1, wherein determining at least one color registration error for at least one type of color registration error produced during the printing of a specific document of the first copy of the print job comprises determining at least one color registration error for at least one type of color registration error with respect to a reference color plane produced during the printing of the specific document of the first copy of the print job.

13. The method as in claim 3, wherein determining at least one color registration error for the at least one type of color registration error produced during the printing of a specific document of the second copy of the print job comprises determining at least one color registration error for the at least one type of color registration error with respect to the reference color plane produced during the printing of the specific document of the second copy of the print job.

14. The method as in claim 5, wherein determining at least one color plane error for at least one type of color registration error produced during the printing of a specific document of the subsequent copy of the print job comprises determining at least one color plane error for at least one type of color registration error with respect to the reference color plane produced during the printing of the specific document of the subsequent copy of the print job.

\* \* \* \* \*